(12) United States Patent
Chen et al.

(10) Patent No.: US 11,256,346 B2
(45) Date of Patent: Feb. 22, 2022

(54) DISPLAY PANEL AND MANUFACTURING METHOD THEREOF, AND DISPLAY APPARATUS

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Jun Chen, Beijing (CN); Qicheng Chen, Beijing (CN); Jun Li, Beijing (CN); Youting Zhang, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 97 days.

(21) Appl. No.: 16/224,116

(22) Filed: Dec. 18, 2018

(65) Prior Publication Data
US 2019/0235653 A1  Aug. 1, 2019

(30) Foreign Application Priority Data
Jan. 31, 2018  (CN) .......................... 201810095500.6

(51) Int. Cl.
*B32B 3/24* (2006.01)
*G06F 3/041* (2006.01)
(Continued)

(52) U.S. Cl.
CPC ............... *G06F 3/041* (2013.01); *G02B 1/14* (2015.01); *G02B 5/003* (2013.01); *G06F 2203/04103* (2013.01)

(58) Field of Classification Search
CPC ....................................................... G02B 5/003
See application file for complete search history.

(56) References Cited

U.S. PATENT DOCUMENTS

| 9,864,116 B2 | 1/2018 | Matsuyuki et al. |
| 2015/0261334 A1* | 9/2015 | Lee .......................... G06F 3/041 345/173 |
| 2017/0184764 A1* | 6/2017 | Matsuyuki ........... H05K 5/0017 |

FOREIGN PATENT DOCUMENTS

| CN | 103777806 A | 5/2014 |
| CN | 104750297 A | 7/2015 |

(Continued)

OTHER PUBLICATIONS

First Office Action dated Jul. 29, 2020 for application No. CN201810095500.6 with English translation attached.

*Primary Examiner* — William P Watkins, III
(74) *Attorney, Agent, or Firm* — Nath, Goldberg & Meyer; Joshua B. Goldberg

(57) ABSTRACT

A display panel and a manufacturing method thereof, and a display apparatus are provided. The display panel is provided with a function hole, the display panel includes a substrate; and a laminated structure for the function hole formed on a substrate; the laminated structure includes a light blocking layer, a semi-transparent layer and a shadow removing layer, the shadow removing layer is provided between the light blocking layer and the semi-transparent layer, and at least entirely covers the function hole. For the display panel, the L value of the semi-transparent ink or blacking ink at the function hole is increased by additionally providing the shadow removing layer at the function hole, reducing the chromatic aberration between the screen printed semi-transparent layer and the light blocking layer at the function hole.

19 Claims, 4 Drawing Sheets

(51) Int. Cl.
*G02B 1/14* (2015.01)
*G02B 5/00* (2006.01)

(56) References Cited

FOREIGN PATENT DOCUMENTS

| CN | 104881158 A | 9/2015 |
| CN | 104890428 A | 9/2015 |

\* cited by examiner

DISPLAY PANEL AND MANUFACTURING METHOD THEREOF, AND DISPLAY APPARATUS

CROSS REFERENCE TO RELATED APPLICATIONS

The present application claims the priority of the Chinese Patent Application with the Application No. 201810095500.6 filed Jan. 31, 2018, which is incorporated herein in the entire by reference.

TECHNICAL FIELD

The present disclosure relates to the field of display technology, in particular to a display panel and a manufacturing method thereof, and a display apparatus.

BACKGROUND

With the development of technology, functions of a display product such as a computer, a phone and a pad are more and more diversified, so it is required to provide more and more function holes (such as a hole for a camera and a hole for a sensor) on the display product.

SUMMARY

The present disclosure provides a display panel and a manufacturing method thereof and a display apparatus.

In an aspect, the present disclosure provides a display panel, including: a substrate; a light blocking layer disposed on the substrate and provided with a through-hole therein; an intermediate layer disposed on the substrate and at least entirely covering a bottom of the through-hole; and a semi-transparent layer provided above the intermediate layer.

In an embodiment of the present disclosure, the intermediate layer entirely covers the bottom and side walls of the through-hole.

In an embodiment of the present disclosure, the through-hole has a gradually increasing aperture in a direction away from the substrate.

In an embodiment of the present disclosure, the intermediate layer is a single-layer structure or a multi-layer structure, and is made of at least one of silicon oxynitride, silicon oxide, silicon nitride and niobium oxide.

In an embodiment of the present disclosure, the intermediate layer is made of the silicon oxynitride, and has a thickness in a range of 800-1000 Å and a refractive index in a range of 1.6-1.7.

In an embodiment of the present disclosure, the intermediate layer is made of niobium pentoxide, and has a thickness in a range of 50-150 Å and a refractive index in a range of 1.8-2.0.

In an embodiment of the present disclosure, an orthographic projection of the through-hole on the substrate is of at least one of a circular shape, a square shape and a rhombus shape.

In an embodiment of the present disclosure, the display panel further includes a protection layer disposed between the intermediate layer and the light blocking layer, wherein the protection layer covers a part of the bottom of the through-hole.

In an embodiment of the present disclosure, the protection layer entirely covers the light blocking layer.

In an embodiment of the present disclosure, the intermediate layer entirely covers a part of the bottom of the through-hole that is not covered by the protection layer, and entirely covers the protection layer, and the semi-transparent layer entirely covers the intermediate layer.

In an embodiment of the present disclosure, the semi-transparent layer is made of an infrared radiation ink or blacking ink.

In an embodiment of the present disclosure, the light blocking layer is made of at least one non-transparent material selected from a group consisting of carbon black, pigment and dye.

In an embodiment of the present disclosure, the protection layer is made of a transparent material.

In an embodiment of the present disclosure, the substrate is a touch screen having a touch function.

In an embodiment of the present disclosure, an orthographic projection of a part of the protection layer covering a part of the bottom of the through-hole on the substrate has a width in a range of 0-25 µm.

In an aspect, the present disclosure provides for manufacturing a display panel, including steps of: providing a substrate; forming a light blocking layer above the substrate such that a through-hole is provided in the light blocking layer to expose a part of the substrate; forming an intermediate layer which at least entirely covers the exposed part of the substrate; and forming a semi-transparent layer on the intermediate layer.

In an embodiment of the present disclosure, before the step of forming an intermediate layer, the method further includes steps of forming a protection layer on the light blocking layer such that the protection layer covers a part of a bottom of the through-hole and entirely covers side walls of the through-hole.

In an embodiment of the present disclosure, the protection layer entirely covers the light blocking layer, the intermediate layer entirely covers a part of the bottom of the through-hole that is not covered by the protection layer, and entirely covers the protection layer, and the semi-transparent layer entirely covers the intermediate layer.

In an embodiment of the present disclosure, the intermediate layer is a single-layer structure or a multi-layer structure and made of at least one of silicon oxynitride, silicon oxide, silicon nitride and niobium oxide; the semi-transparent layer is made of an infrared radiation ink or blacking ink; the light blocking layer is made of at least one non-transparent material selecting from a group consisting of carbon black, pigment and dye; and the protection layer is made of a transparent material.

In an aspect, the present disclosure provides a display apparatus, including the display panel of the present disclosure and a sensor, wherein a collection window of the sensor is provided at a side of the display panel away from the substrate to correspond to the through-hole.

DETAIL DESCRIPTION OF EMBODIMENTS

A display panel and a display apparatus of the present disclosure will be described in details below in conjunction with the accompanying drawings and detail description of embodiments such that those skilled in the art can understand the technical solution of the present disclosure better.

It becomes a technical problem urgently to be solved at present that how to hide function holes better for providing users with a good visual experience.

Figure 1:
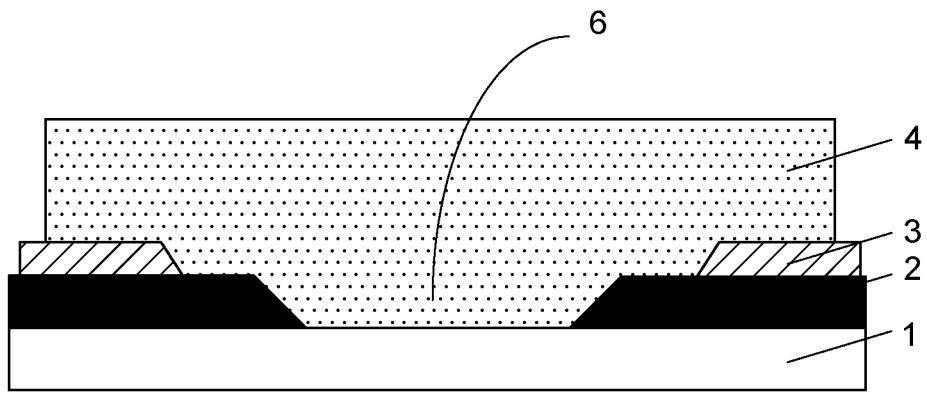
FIG. 1 is a cross-sectional view of a display panel provided with a function hole in the related art.

FIG. 1 is a cross-sectional view of a display panel provided with a function hole in the related art. As shown in FIG. 1, the display panel is provided with a function hole. A laminated structure for the function hole is formed above a substrate 1, including a light blocking layer/black matrix (BM) 2, a protection/insulating layer 3, a semi-transparent layer 4 and a through-hole (a function hole) 6. The protection layer 3 is provided on a part of the light blocking layer 2, as shown in FIG. 1, and the semi-transparent layer 4 is directly formed at the function hole 6 with a print screening method.

As an example of the semi-transparent layer 4, a semi-transparent ink layer (that is, an infrared radiation ink layer (IR layer)) has a transmittance for visible light with a wave length of 550 nm of below 10%, and a transmittance for visible light with a wave length of 850 nm of above 80%. By means of such a semi-transparent ink layer, at the function hole, a person can view the non-transparent black, while a high transmittance for a camera is obtained.

Figure 2:
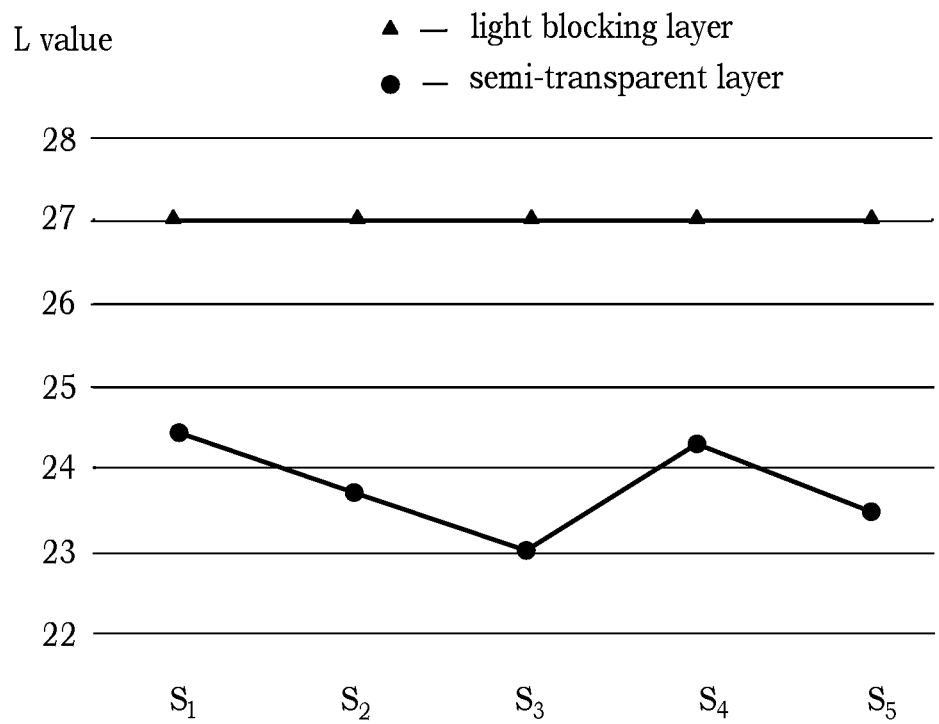
FIG. 2 is a diagram illustrating comparison between L values for a light blocking material with a semi-transparent material from different samples of the display panel in FIG. 1.
Figure 3:
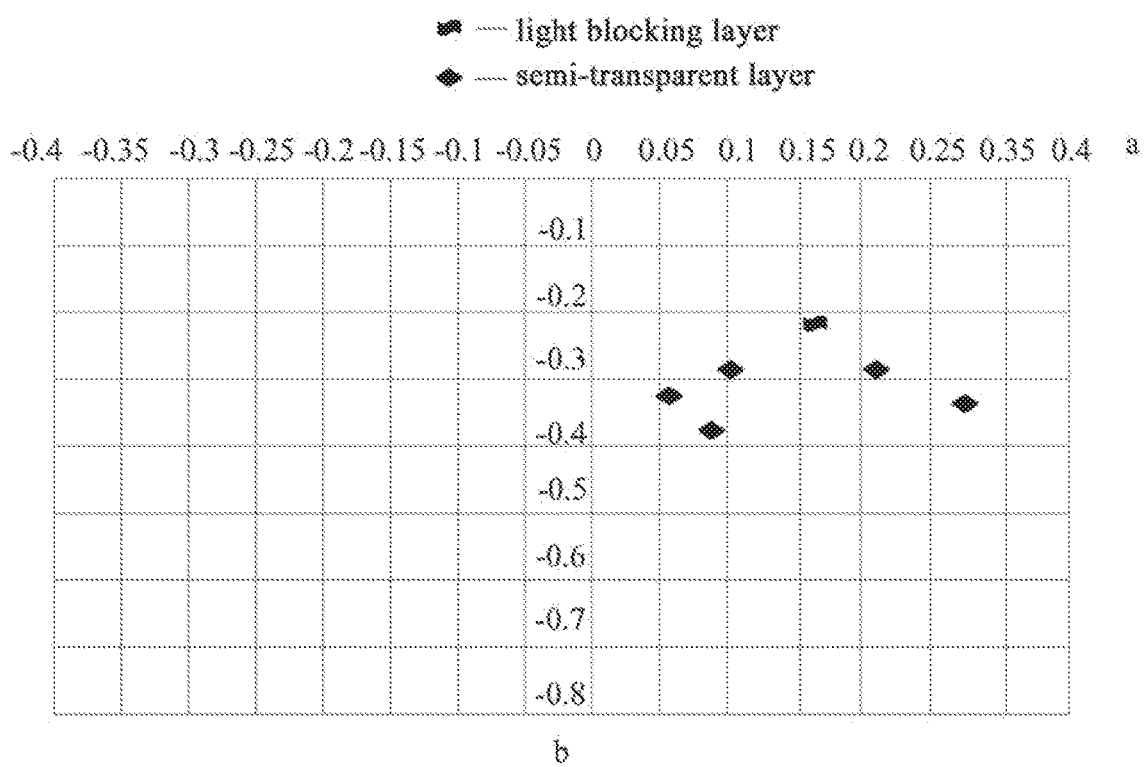
FIG. 3 is a diagram illustrating comparison between a·b values for a light blocking material with a semi-transparent material from different samples of the display panel in FIG. 1.
Figure 4:
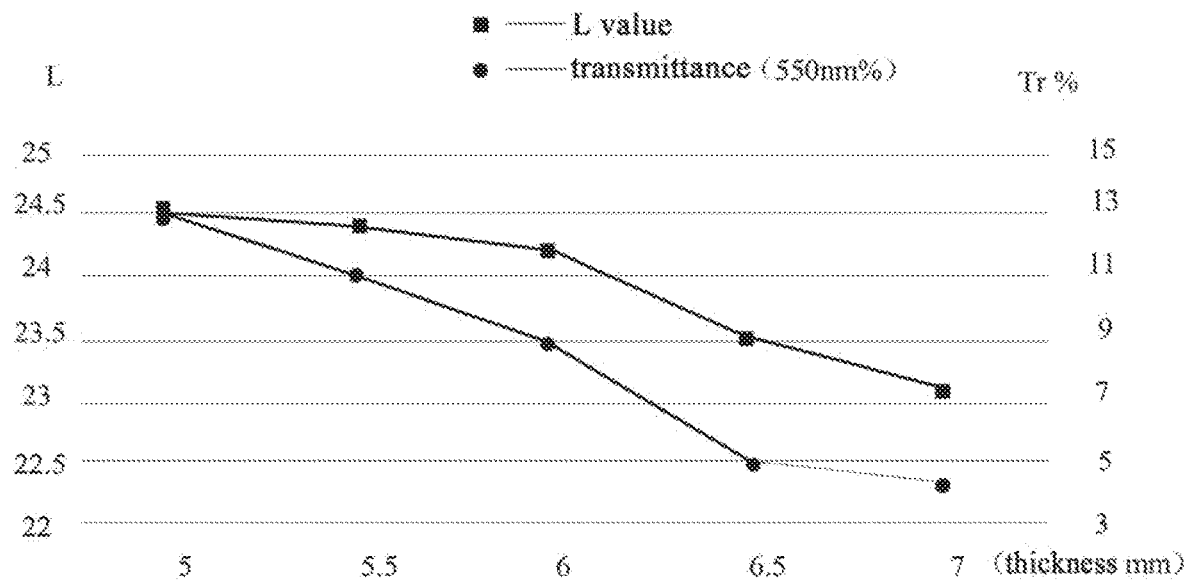
FIG. 4 is diagram illustrating comparison of a transmittance and an L value versus a thickness of a semi-transparent material of the display panel in FIG. 1.

FIG. 2 is a diagram illustrating comparison between L values for a light blocking material for the light blocking layer 2 with a semi-transparent ink material for the semi-transparent layer 4 from different samples of the display panel in FIG. 1; FIG. 3 is a diagram illustrating comparison between a·b values for a light blocking material for the light blocking layer 2 with a semi-transparent material for the semi-transparent layer 4 from different samples of the display panel in FIG. 1; FIG. 4 is a diagram illustrating comparison between a transmittance and an L value versus a thickness of a semi-transparent material for the semi-transparent layer 4 of the display panel in FIG. 1.

FIG. 2 illustrates comparison of differences between L values for a light blocking material from a same manufacturer with samples of a semi-transparent ink material from different manufacturers ($S_i$, i=1~5), where a vertical axis represents the L values. FIG. 3 illustrates comparison of differences between a·b values for a light blocking material from a same manufacturer with samples of a semi-transparent ink material from different manufacturers ($S_i$, i=1~5). The Lab color mode is a color calibration mode specified by the Commission International Eclairage (CIE), which is performed at a condition of a uniform light source. For example, an L value of the semi-transparent layer 4 in FIG. 1 is obtained by testing a reflectivity thereof after prepared on a glass. Methods of testing a·b values for all materials in FIGS. 2-4 are same, which are obtained by testing a reflectivity thereof after respective films are prepared on a same glass. The Lab color mode consists of luminosity (L) and a and b values associated with colors, where the L value represents luminosity, the a and b values are two color channels. Colors associated with the value are from dark green (with a low luminosity) to gray (with a medium luminosity), then to light pink (with a high luminosity); Colors associated with the b value are from light blue (with a low luminosity) to gray (with a medium luminosity), then to yellow (with a high luminosity). It can be seen from FIGS. 2-3 that for a·b values of the semi-transparent ink material, no chromatic aberration between the semi-transparent ink material and the light blocking material is obtained by adjusting a formulation of ink, but differences between L values of the semi-transparent ink material and the light blocking material are in a range from 2.5 to 4, such that the differences cannot be reduced by adjusting a formula of the semi-transparent ink.

In addition, as shown in FIG. 4, from the diagram illustrating a transmittance Tr and an L value versus a thickness of samples of the same semi-transparent ink material, it can be seen that the smaller thickness of the semi-transparent ink material is, both higher Tr and L values are, such that it cannot meet requirements where a transmittance Tr of a semi-transparent ink material for visible light with a wave length of 550 nm is below 10%.

In an embodiment of the present disclosure, a display panel is provided, which improves the chromatic aberration between the screen printed semi-transparent ink material and the light blocking material, obtaining the function hole with an invisible appearance, thereby obtaining an effect where the appearance is in one color, that is, the effect of no color shift between the two materials. Specifically, the L value of the semi-transparent ink material at the through-hole is improved by an outward extension of the protection layer at the function hole and an addition of a shadow removing layer (which is also termed as an intermediate layer, which is added for reducing the chromatic aberration between the semi-transparent layer and the light blocking layer), such that the L value of the semi-transparent ink material at the through-hole is improved and differences between L values for a light blocking material and a semi-transparent ink material are thus reduced, obtaining the effect of no color shift between the two materials, thus, improving the experience for an appearance of a customer.

Specifically, a display panel according to an embodiment of the present disclosure will be described in details below in conjunction with FIG. 5.

Figure 5:
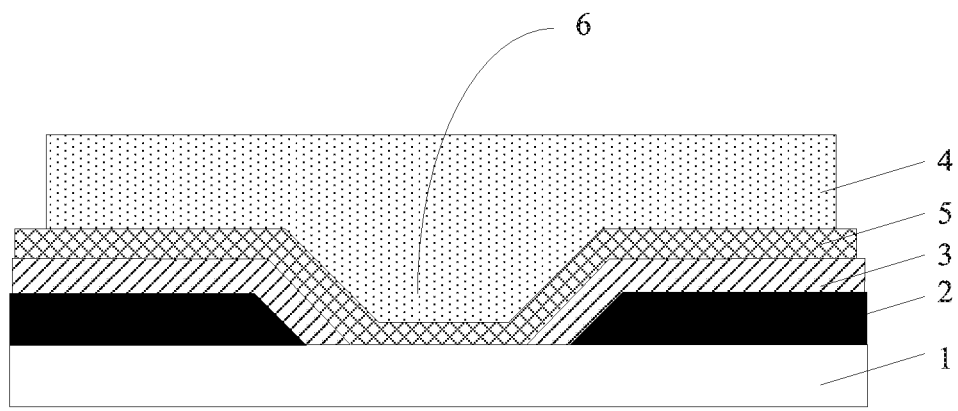
FIG. 5 is a cross-sectional view of a display panel provided with a function hole according to an embodiment of the present disclosure.

FIG. 5 is a cross-sectional view of a display panel provided with a function hole according to the present disclosure. As shown in FIG. 5, the display panel is provided with a function hole. A laminated structure for the function hole is formed above a substrate 1, including a light blocking layer 2, a semi-transparent layer 4, a shadow removing layer 5 (which is also termed as an intermediate layer) and a through-hole 6. The shadow removing layer 5 is provided between the light blocking layer 2 and the semi-transparent layer 4, and at least entirely covers the through-hole 6. Certainly, on the basis of entirely covering the through-hole 6, the shadow removing layer 5 may also at least cover a peripheral region of the light blocking layer 2 at the through-hole 6. The laminated structure is provided at the peripheral region, to improve the effect of hiding the function hole.

In an embodiment of the present disclosure, a display panel is provided, including a substrate 1; a light blocking layer 2 provided on the substrate 1 and in which a through-hole is provided; an intermediate layer provided on the substrate 1 and at least entirely covering the through-hole; and a semi-transparent layer 4 provided above the intermediate layer.

The intermediate layer may entirely cover a bottom and a side wall of the through-hole.

For example, a sensor receives light through the through-hole 6, and a collection window of the sensor is provided at a side of the display panel away from the substrate and provided at a position corresponding to the through-hole. As shown in FIG. 5, the through-hole 6 is provided in the light blocking layer 2, an aperture of the through-hole gradually increases in a direction proximal to the semi-transparent layer 4; and the shadow removing layer 5 at least entirely covers the bottom of the through-hole. A minimum aperture of the through-hole 6 is not less than an area of the collection window of the sensor (for example, the window can receive light such as visual light, infrared light or UV-light), such that emitting light and hiding the difference between the function hole and the sensor can be ensured.

In the present embodiment, as shown in FIG. 5, the side wall of the through-hole 6 is an inclined surface which is gradually close to a center axis (not shown) of the through-hole 6 from the semi-transparent layer 4 to the light blocking layer 2. As shown in FIG. 5, an angle of the side wall of the through-hole 6 with respect to the substrate 1 is an obtuse angle. The laminated structure at the function hole 6 forms a gradient structure in which light has a gradient optical path difference, obtaining no color shift between the through-hole 6 and the peripheral region of the through-hole 6 in appearance. An angle of view is increased by allowing more light to enter the through-hole 6, and the inclined angle is varied depending on the configuration of the laminated structure.

Figure 6:
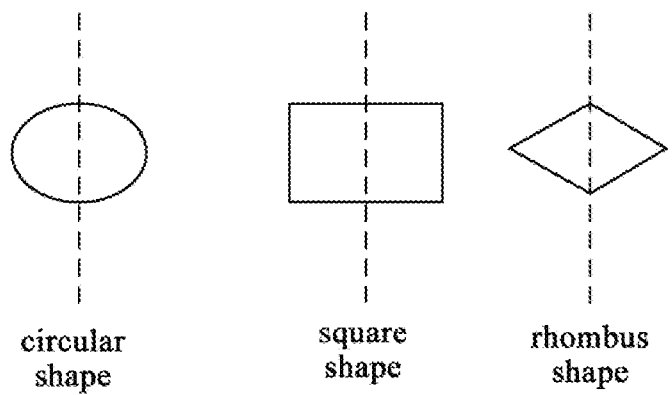
FIG. 6 is a schematic view illustrating shapes for a function hole according to an embodiment of the present disclosure.

FIG. 6 is a schematic view illustrating shapes for the function hole according to an embodiment of the present disclosure. An orthographic projection of the through-hole on the substrate is at least one of a circular shape, a square shape and a rhombus shape, as shown in FIG. 6. In fact, a cross-sectional shape of the through-hole may be the regular shape as shown in FIG. 5 or any other irregular shape as required, and may be freely selected according to the shape of the collection window of the sensor. With diverse shapes for the through-hole, the use thereof is wider.

For the display panel of the present disclosure, the semi-transparent ink may be formed at the through-hole in a screen printing method, as described in the example as shown in FIG. 1. In a structural view of the through-hole of a related display product shown in FIG. 1, the semi-transparent ink is directly screen printed at the function hole. Since there is a chromatic aberration between the screen printed semi-transparent ink and the light blocking material of the light blocking layer 2 manufactured by a yellow-light photolithography process, there is a difference between the semi-transparent ink screen printed at the function hole and the light blocking layer in color, such that the function hole is visible, the integrated color effect for the through-hole and the peripheral region of the through-hole is bad, affecting an appearance experience for a customer. In the present disclosure, the shadow removing layer is provided to achieve a better integrated color effect between the through-hole and the peripheral region of the through-hole, and improve the appearance experience for the customer.

In the display panel of the present embodiment, optionally, the shadow removing layer 5 may be a single-layer structure or a multi-layer structure formed by using at least one of silicon oxynitride (SiNxOy), silicon oxide, silicon nitride and niobium oxide. With a single-layer structure, as shown in FIG. 5, the shadow removing layer 5 is made of the silicon oxynitride, a thickness of the shadow removing layer 5 is in a range of 800-1000 Å and a refractive index of the shadow removing layer 5 is 1.6-1.7, for example 1.65; alternatively, the shadow removing layer 5 is made of niobium pentoxide, a thickness of the shadow removing layer 5 is in a range of 50-150 Å and a refractive index of the shadow removing layer 5 is 1.8-2.0, for example 1.9. With a multi-layer structure, for example a two-layer structure, the shadow removing layer 5 is made of niobium pentoxide with a thickness of 100 Å followed by silicon dioxide with a thickness of 400 Å above; alternatively, with a three-layer structure, the shadow removing layer 5 is made of niobium pentoxide with a thickness of 100 Å followed by silicon dioxide with a thickness of 400 Å above and followed by silicon oxynitride with a thickness of 800-1000 Å. A specific layer structure and the used material of the shadow removing layer 5 may be configured as required, which is not limited herein. The shadow removing layer 5 is additionally provided below the semi-transparent layer 4, which make the L values of the light blocking layer 2 and the semi-transparent layer 4 close to each other in combination with a proper thickness and a proper refractive index for the shadow removing layer 5, obtaining the effect of no color shift.

Optionally, the shadow removing layer 5 may be designed as a whole-layer structure, and may be formed by a physical vapor deposition (PVD) process, which is a well known technology process for easily obtaining a better effect for the layer structure. Certainly, in consideration of thinning for regions without the function hole, it may also be possible to only remain the semi-transparent ink at regions corresponding to the through-hole and the peripheral region of the through-hole by using a mask plate, and remove the semi-transparent ink at other regions.

The semi-transparent layer 4 has a semi-transparent function, and also has a reflection function for light shading. The semi-transparent layer 4 is made of the semi-transparent ink and is formed by a screen printing process. Alternatively, in other embodiments of the present disclosure, a material of the semi-transparent layer 4 may be a blacking ink.

The light blocking layer 2 is only provided at the peripheral region of the through-hole for light shading. The light blocking layer 2 is made of a non-transparent material or a light blocking material including carbon black, pigment and dye and is formed by a yellow-light photolithography process.

In the display panel as shown in FIG. 5, optionally, the laminated structure forming the through-hole further includes a protection layer 3 provided between the shadow removing layer 5 (i.e. the intermediate layer) and the light blocking layer 2. The protection layer 3 entirely covers the peripheral region of the through-hole 6, that is, the protection layer 3 covers a part of the bottom of the through-hole 6.

In the embodiment as shown in FIG. 5, the protection layer 3 entirely covers the light blocking layer 2. That is, the protection layer 3 is conformally formed on the light blocking layer 2, and thus, with respect to the light blocking layer 2, the protection layer 3 extends beyond the light blocking layer 2 towards the through-hole 6 for covering a part of the bottom of the through-hole 6. An orthographic projection of the part of the protection layer 3 covering the part of the bottom of the through-hole 6 on the substrate is 0-25 μm in width.

At the edge of the through-hole 6, an aperture of the protection layer 3 is less than that of the light blocking layer 2. That is, the protection layer 3 extends beyond the region corresponding to an orthographic projection of the light blocking layer 2, and the width of the protection layer 3 at the peripheral region of the through-hole 6 is 0-25μ 5. Since the protection layer 3 is made of a transparent material, seen from the substrate 1, the thickness of the screen printed semi-transparent ink material at the peripheral region of the through-hole 6 is less than that at a center region, such that the L value of the semi-transparent ink material at the edge of the through-hole 6 is reduced, reducing the color difference at the edge of the function hole, obtaining the integrated color effect for the appearance, hiding the function hole better, and bringing a better visual experience to the user.

The function hole is designed as the laminated structure, the L value of the semi-transparent ink material at the edge of the function hole is changed by additionally providing the shadow removing layer at the function hole, and the peripheral region of the through-hole is designed as a climbing structure for forming a graded color transition, thereby eliminating the chromatic aberration between the screen printed semi-transparent ink material and the light blocking material. And the L value of the semi-transparent ink material at the function hole is increased by additionally providing the shadow removing layer, reducing the difference between the L values of the semi-transparent ink material and the light blocking material, and in combination of the outward extension of the protection layer 3 at the function hole, the function hole is invisible, thereby obtaining the integrated color effect for the function hole and the peripheral region in appearance, and thus, improving the appearance experience for the user.

The function hole in the display panel of the present embodiment is suitable for sensors with various uses and shapes. The sensors include a camera, a light sensor or a face recognition sensor.

In an embodiment, the display panel includes a touch screen in which the function hole is provided; or, the display panel includes a glass cover-plate on which the function hole is provided. Alternatively, the substrate is a touch screen with a touch function. The protection layer 3 can protect the above display panel, and protect the touch screen in the case where the touch screen is provided.

In an embodiment of the present disclosure, a display panel is provided, and includes the function hole in a touch screen/a glass cover-plate. The L value of the semi-transparent ink or blacking ink at the function hole is increased by additionally providing the shadow removing layer at the function hole, reducing the chromatic aberration between the screen printed semi-transparent layer and the light blocking layer at the function hole, and at the edge region of the function hole, the protection layer extends beyond the light blocking region, reducing the thickness of the semi-transparent ink at the edge of the function hole, thereby increasing the L value of the semi-transparent ink or blacking ink at the edge of the function hole, such that the chromatic aberration between the semi-transparent ink or blacking ink and the light blocking layer is reduced, thereby obtaining the integrated color effect for the function hole and the peripheral region of the function hole in appearance, and thus improving the appearance experience for the user.

The display panel of the present embodiment solves the following technical problem in the related art: there is the chromatic aberration between the screen printed ink and the light blocking material at the function hole, thus affecting the visual effect. The display panel of the present embodiment is especially suitable for the field of a touch display and the field of a flexible display.

Figure 7:
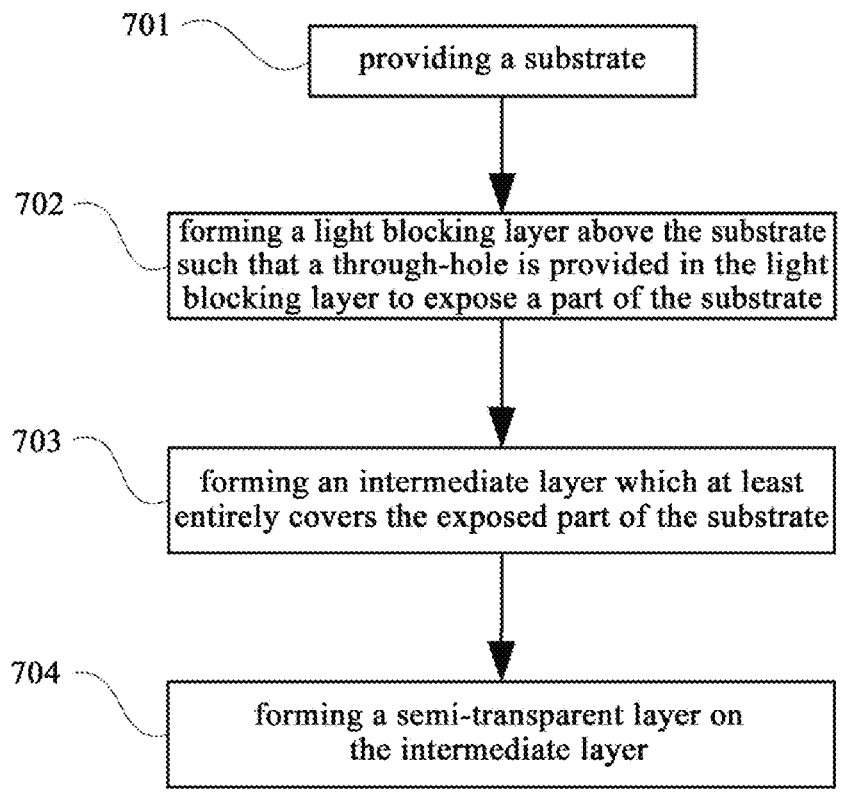
FIG. 7 shows a flow chart illustrating a method for manufacturing a display panel according to an embodiment of the present disclosure.

FIG. 7 shows an exemplary block diagram of a method for manufacturing a display panel according to an embodiment of the present disclosure. The method includes the following steps: step 701, providing a substrate; step 702, forming a light blocking layer above the substrate such that a through-hole is provided in the light blocking layer to expose a part of the substrate; step 703, forming an intermediate layer which at least entirely covers the exposed part of the substrate; and step 704, forming a semi-transparent layer on the intermediate layer.

Figure 8:
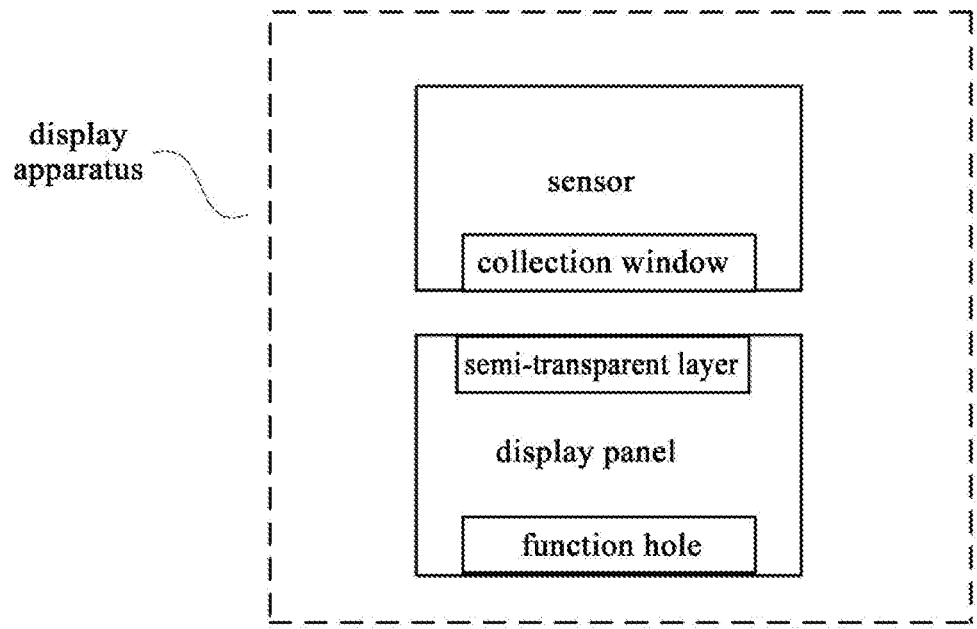
FIG. 8 shows an exemplary block diagram of a display apparatus according to an embodiment of the present disclosure.

FIG. 8 shows an exemplary block diagram of a display apparatus according to an embodiment of the present disclosure. The present embodiment provides a display apparatus, including the display panel of the present embodiment and a sensor. A collection window of the sensor is provided at a side of the display panel away from the substrate and a position corresponding to the through-hole.

The display apparatus may be any product or component having a function of display such as a desktop, a tablet PC, a laptop, a mobile phone, a PDA, a GPS, an on-board display, a projection display, a camera, a digital camera, an electronic watch, a calculator, an electronic instrument, a meter, a liquid crystal panel, an OLED panel, an electronic paper, a television, a display, a digital photo frame, and a navigator, which may be applied to various fields, such as a public display and a virtual display.

It should be understood that the above embodiments are merely exemplary embodiments used only for illustrating the principle of the present disclosure. However, the present disclosure is not limited thereto. Obviously, those skilled in the art can make various modifications and variants to this disclosure without departing from spirit and scope of this disclosure. As such, if these modifications and variants of this disclosure fall into the scope of the claims and their equivalents, the present disclosure intends to include these modifications and variants.

What is claimed is:

1. A display panel, comprising:
a substrate;
a light blocking layer, disposed on the substrate and provided with a through-hole therein, wherein an angle of a side wall of the through-hole with respect to the substrate is an obtuse angle;
an intermediate layer, disposed on the substrate and at least entirely covering a bottom and the side wall of the through-hole, wherein an angle of a part of the intermediate layer covering the side wall of the through-hole with respect to the substrate is an obtuse angle, and the intermediate layer further at least covers a peripheral region of the light blocking layer at the through-hole; and
a semi-transparent layer provided on a side of the intermediate layer distal to the substrate and made of an infrared radiation ink or blacking ink.

2. The display panel of claim 1, wherein the intermediate layer entirely covers the bottom and the side wall of the through-hole, and an upper surface of the light blocking layer.

3. The display panel of claim 2, wherein the through-hole has a gradually increasing aperture in a direction away from the substrate.

4. The display panel of claim 3, wherein the intermediate layer is a single-layer structure or a multi-layer structure, and is made of at least one of silicon oxynitride, silicon oxide, silicon nitride and niobium oxide.

5. The display panel of claim 4, wherein the intermediate layer is made of the silicon oxynitride, and has a thickness in a range of 800-1000 Å and a refractive index in a range of 1.6-1.7.

6. The display panel of claim 4, wherein the intermediate layer is made of niobium pentoxide, and has a thickness in a range of 50-150 Å and a refractive index in a range of 1.8-2.0.

7. The display panel of claim 1, wherein an orthographic projection of the through-hole on the substrate is of at least one of a circular shape, a square shape and a rhombus shape.

8. The display panel of claim 2, further comprising a protection layer disposed between the intermediate layer and the light blocking layer, wherein the protection layer covers a part of the bottom of the through-hole.

9. The display panel of claim 8, wherein the protection layer entirely covers the light blocking layer.

10. The display panel of claim 9, wherein the intermediate layer entirely covers a part of the bottom of the through-hole that is not covered by the protection layer, and entirely covers the protection layer; and the semi-transparent layer entirely covers the intermediate layer.

11. The display panel of claim 1, wherein the light blocking layer is made of at least one non-transparent material selected from a group consisting of carbon black, pigment and dye.

12. The display panel of claim 8, wherein the protection layer is made of a transparent material.

13. The display panel of claim 1, wherein the substrate is a touch screen having a touch function.

14. The display panel of claim 8, wherein an orthographic projection of a part of the protection layer covering a part of the bottom of the through-hole on the substrate has a width in a range of 0-25 μm.

15. A method for manufacturing a display panel, comprising steps of:

providing a substrate;

forming a light blocking layer above the substrate such that a through-hole is provided in the light blocking layer to expose a part of the substrate and an angle of a side wall of the through-hole with respect to the substrate is an obtuse angle;

forming an intermediate layer which at least entirely covers the exposed part of the substrate and the side wall of the through-hole such that an angle of a part of the intermediate layer covering the side wall of the through-hole with respect to the substrate is an obtuse angle, wherein the intermediate layer further at least covers a peripheral region of the light blocking layer at the through-hole; and forming a semi-transparent layer on a side of the intermediate layer distal to the substrate with an infrared radiation ink or blacking ink.

16. The method of claim 15, wherein before the step of forming an intermediate layer, the method further comprises steps of forming a protection layer on the light blocking layer such that the protection layer covers a part of a bottom of the through-hole and entirely covers the side wall of the through-hole.

17. The method of claim 16, wherein the protection layer entirely covers the light blocking layer, the intermediate layer entirely covers a part of the bottom of the through-hole that is not covered by the protection layer, and entirely covers the protection layer, and the semi-transparent layer entirely covers the intermediate layer.

18. The method of claim 17, wherein the intermediate layer is a single-layer structure or a multi-layer structure and made of at least one of silicon oxynitride, silicon oxide, silicon nitride and niobium oxide;

the light blocking layer is made of at least one non-transparent material selecting from a group consisting of carbon black, pigment and dye; and the protection layer is made of a transparent material.

19. A display apparatus, comprising the display panel of claim 1 and a sensor, wherein a collection window of the sensor is provided at a side of the display panel away from the substrate to correspond to the through-hole.

* * * * *